W. E. AND G. W. ANDERSON.
VALVE OPERATING MECHANISM.
APPLICATION FILED JAN. 11, 1921.
1,435,951.
Patented Nov. 21, 1922.
3 SHEETS—SHEET 3.
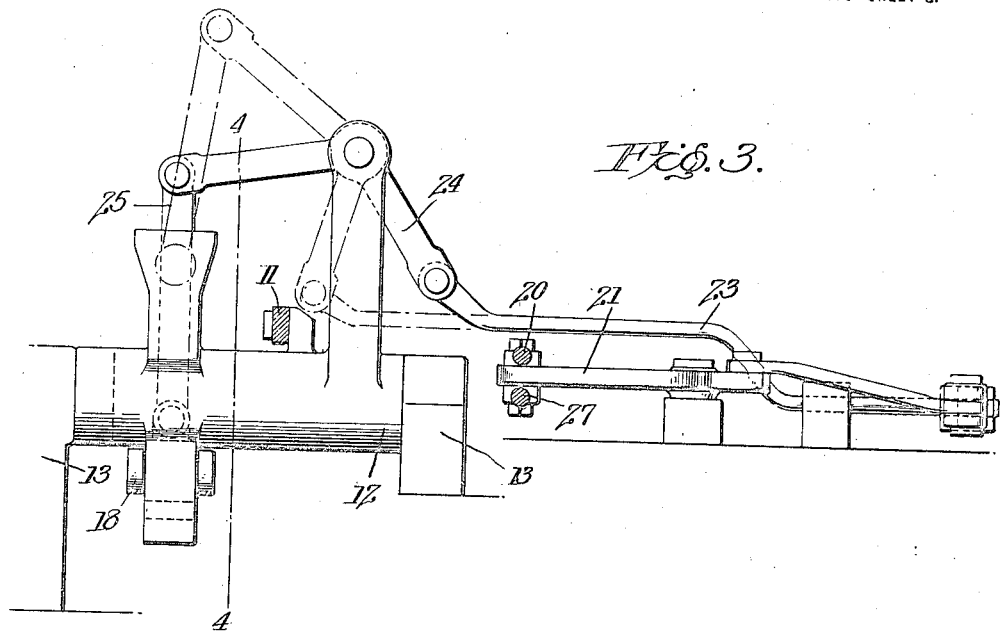
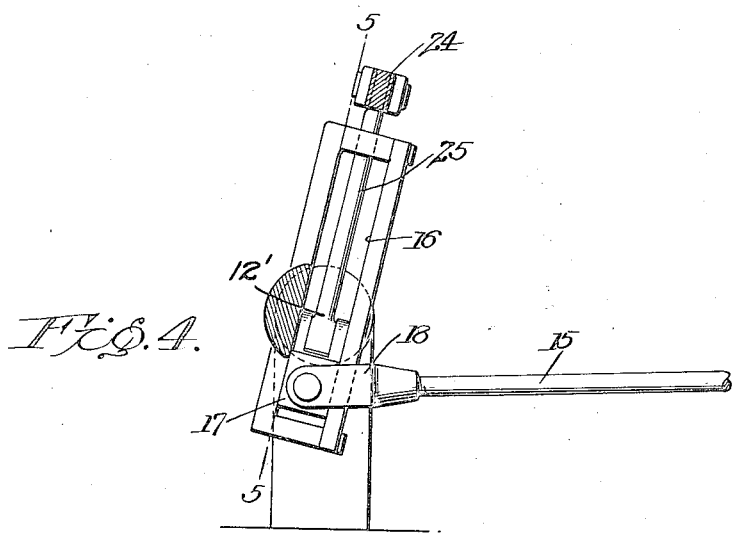
Walter E. Anderson,
George W. Anderson,
INVENTOR Patented Nov. 21, 1922.

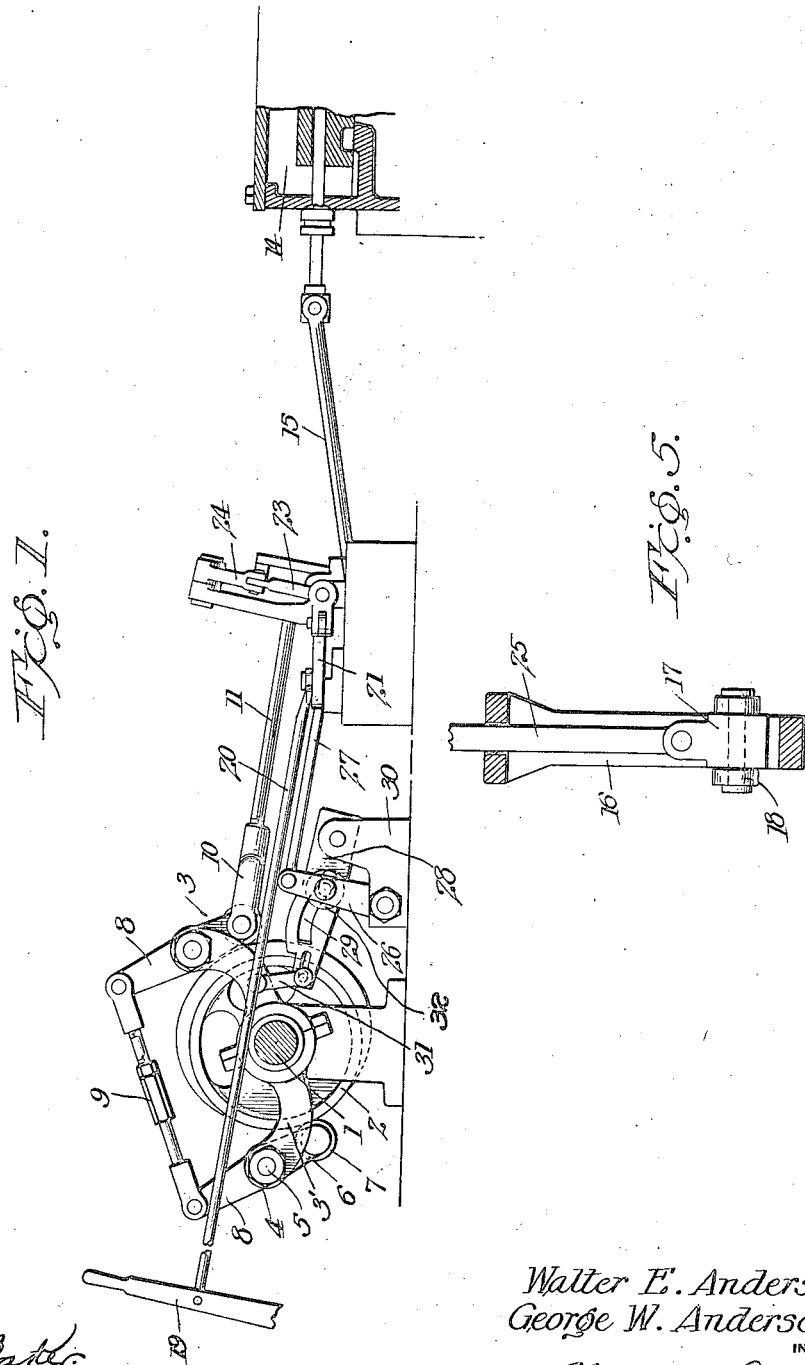

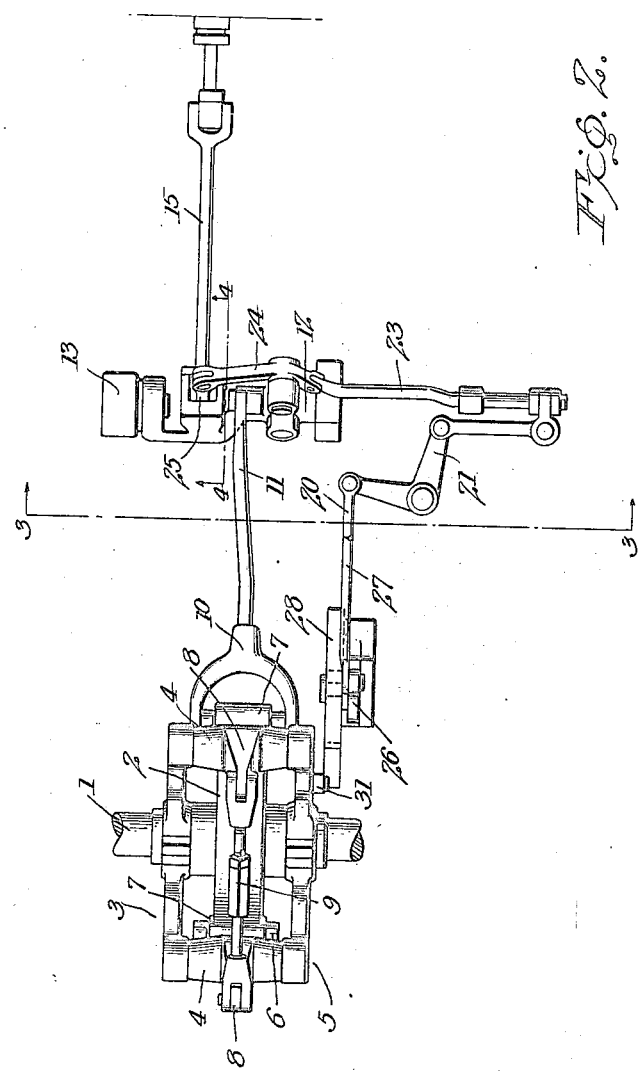

1,435,951

UNITED STATES PATENT OFFICE.

WALTER E. ANDERSON AND GEORGE WALLACE ANDERSON, OF IDAHO FALLS, IDAHO.

VALVE-OPERATING MECHANISM.

Application filed January 11, 1921. Serial No. 436,507.

*To all whom it may concern:*

Be it known that we, WALTER E. ANDERSON and GEORGE WALLACE ANDERSON, citizens of the United States, residing at Idaho Falls, in the county of Bonneville and State of Idaho, have invented new and useful Improvements in Valve-Operating Mechanism, of which the following is a specification.

This invention relates to improved valve motion for steam engines, the general object of the invention being to provide means for shifting the pivotal connection of the valve rod for causing the reverse action of the valve instead of shifting the connecting link.

Another object of the invention is to provide means for shifting the cam operated mechanism at the same time the connection of the valve rod is shifted.

A further object of the invention is to provide means for adjusting the cam engaging parts in relation to the cam.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a side view of the invention.
Figure 2 is a plan view.
Figure 3 is an enlarged section on line 3—3 of Figure 2.
Figure 4 is an enlarged section on line 4—4 of Figure 2.
Figure 5 is a section on line 5—5 of Figure 4.

In these views 1 indicates the cam shaft and 2 indicates the cam wheel thereon. A cage 3 is rotatably mounted on the cam shaft, the cage consisting of two pairs of curved arms 3', one pair being arranged on each side of the cam wheel. At each end of the cage is rotatably supported a sleeve 4, the sleeve being supported by the bolt 5 which passes through said sleeve into the ends of the arms. This sleeve has downwardly projecting ears 6 thereon between which is journaled the roller 7 for engaging the periphery of the cam wheel. An arm 8 projects upwardly from said sleeve and the two arms are adjustably connected together by the turn buckle arrangement 9. Thus by adjusting said turn buckle the rollers can be moved towards or away from each other so that their engagement with the cam wheel can be adjusted.

It will thus be seen that as the cam wheel revolves the engagement of the rollers therewith will cause the sleeves and the arms to rock back and forth.

A yoke member 10 is pivotally connected with the ears of the front sleeve and a rod 11 connects the yoke member with an ear formed on the horizontally arranged shaft 12 mounted in the bearings 13 so that the rocking movement of the cage by the cam wheels will cause said shaft to rock back and forth. This shaft 12 is connected with the valve 14 by the connecting rod 15 so that the valve will slide back and forth when the shaft 12 is rocked. Thus by forming the cam wheel of the proper shape the movement of the valve can be controlled to suitably control the passing of steam to the cylinders by the movement of the cam wheel.

In order to permit reversal of the engine I provide reversing means which includes means for shifting the connection of the connecting rod 15 with the rock shaft 12. Such means consists of a rightangularly extending guideway 16 connected with the shaft and a block 17 thereon to which the fork 18 on the end of the connecting rod 15 is pivoted. Thus by moving the block 17 above or below the longitudinal plane of the rock shaft 12 as shown on Figure 4 the movement of the valve can be made to so control the steam that the engine can be driven in a forward or reverse direction.

The means for shifting the block and guideway comprises a hand lever 19 connected by the rod 20 with the bell crank 21, said bell crank being connected by the link 22 with the reciprocating rod 23 to reciprocate the same. This rod is connected with the vertically arranged bell crank 24 which has its other arm connected by the link 25 with the block. Thus by swinging the hand lever the block can be adjusted to the upper or lower part of the guideway.

As it is necessary to properly position the rollers with respect to the cam wheel when the block is shifted from one position to the other I provide means for shifting the cage when the hand lever is actuated. Such means consists of an upright lever 26 pivoted at its lower end and having its upper end connected by the link 27 with the bell crank 21 so that said lever is rocked when the bell crank is moved by the hand lever. A slotted lever 28 having a curved slot 29 therein is pivoted at one end to the bracket 30 with which the lever 26 is pivoted and the other end of this slotted lever is connected by a link 31 with one of the forward arms of the cage. We prefer to connect the link 31 with the lever 28 by a bolt and slot connection so that the two parts can be adjustably connected together. A roller 32 on lever 26 engages the slot 29 in the slotted lever so that as said lever 26 is moved back and forth the roller engaging the curved slot will cause said slotted lever to rock in a vertical plane and thus rock the cage upon the crank shaft.

It will thus be seen that by simply changing the position of the hand lever the cage with the rollers thereon will be properly adjusted on the cam wheel at the same time that the pivotal point of the valve rod is changed.

When the engine is to be driven in a forward direction the hand lever 19 is shoved forwardly to lower block 17 below the longitudinal plane through 12′ to rock the cage rearwardly. Similarly 19 is moved rearwardly for the reverse motion which also rocks the cage rearwardly.

It is thought from the foregoing description that the advantages and novel features of the invention will be readily apparent.

We desire it to be understood that we may make changes in the construction and in the combination and arrangement of the several parts, provided that such changes fall within the scope of the appended claims.

What we claim is:—

1. Valve mechanism of the class described comprising a cam, a roller cage, a roller therein engaging the cam, a rock shaft, means for connecting the cage with the rock shaft, a valve, a valve rod connected with the rock shaft, means for adjusting the connection of the rod with the rock shaft in order to reverse the movement of the valve, means for adjusting the cage relatively to the cam for properly timing the movement of the valve in both its reverse and forward motions and manually operated means for simultaneously adjusting the cage and the rod connection with the rock shaft.

2. Valve mechanism of the class described comprising a cam shaft, a cam therein, a roller cage rockingly supported on the shaft, rollers in the cage engaging the cam, a rock shaft, a connecting rod connecting the same with the cage, a valve, a valve rod connected with the rock shaft, manually operated means for shifting the connection of the rod with the rock shaft to a point above or below the longitudinal axis of said shaft and means for simultaneously moving the cage on the cam shaft.

3. Valve mechanism of the class described comprising a cam shaft, a cam therein, a roller cage rockingly supported on the shaft, rollers in the cage engaging the cam, a rock shaft, a connecting rod connecting the same with the cage, a valve, a valve rod connected with the rock shaft, manually operated means for shifting the connection of the rod with the rock shaft to a point above or below the longitudinal axis of said shaft, means for simultaneously moving the cage on the cam shaft and means for adjusting the position of the rollers in the cage relative to the cam.

In testimony whereof we affix our signatures.

WALTER E. ANDERSON.
GEORGE WALLACE ANDERSON.